United States Patent [19]
Lutz et al.

[11] Patent Number: 5,314,290
[45] Date of Patent: May 24, 1994

[54] CARGO CARRYING VEHICLE HAVING A MOVABLE BULKHEAD LOCATED THEREIN

[76] Inventors: David E. Lutz, P.O. Box 810; David W. Lutz, P.O. Box 4444, both of Carlisle, Pa. 17013

[21] Appl. No.: 771,185
[22] Filed: Oct. 4, 1991
[51] Int. Cl.⁵ .................................. B60P 1/00
[52] U.S. Cl. .................... 414/509; 414/516; 414/517; 414/525.1; 414/525.6
[58] Field of Search ............ 414/509–517, 414/521, 525.1, 525.2, 525.3, 525.6

[56] References Cited

U.S. PATENT DOCUMENTS

| | | | |
|---|---|---|---|
| 2,634,872 | 4/1953 | Gosse | 414/585 X |
| 2,693,890 | 11/1954 | Bridge | 414/509 |
| 2,714,968 | 8/1955 | Babcock, Jr. | 414/511 |
| 2,820,560 | 1/1958 | Davis | 414/500 |
| 2,912,129 | 11/1959 | Varrone | 414/510 X |
| 3,140,076 | 7/1964 | Steadman | 414/511 X |
| 3,422,973 | 1/1969 | Longman | 414/511 |
| 3,465,902 | 9/1969 | Colletti | 414/679 |
| 3,572,563 | 3/1971 | Oliver | 414/514 |
| 3,648,868 | 3/1972 | Richler | 414/509 X |
| 3,688,944 | 9/1972 | Gagel | 414/509 X |
| 3,722,717 | 3/1973 | Stryczek | 414/510 X |
| 3,815,764 | 6/1974 | Gilfillan et al. | 414/513 |
| 4,015,727 | 4/1977 | Rezac | 414/521 |
| 4,078,682 | 3/1978 | Johnson, Jr. | 414/515 X |
| 4,082,196 | 4/1978 | Lutz et al. | 414/521 |
| 4,113,122 | 9/1978 | Lutz | 414/521 X |
| 4,144,963 | 4/1979 | Hallstrom | 198/750 |
| 4,234,130 | 11/1980 | Trott et al. | 414/511 X |
| 4,260,317 | 4/1981 | Martin et al. | 414/517 |
| 4,431,360 | 2/1984 | Maeno | 414/514 X |
| 4,578,015 | 3/1986 | Baldarelli et al. | 414/513 |
| 4,580,678 | 4/1986 | Foster | 198/750 |
| 4,727,978 | 3/1988 | Hallstrom, Jr. | 198/737 |
| 4,830,178 | 5/1989 | de Vries | 198/774 |
| 4,842,471 | 6/1989 | Hodgetts | 414/514 X |
| 4,856,645 | 8/1989 | Hallstrom, Jr. | 198/750 |
| 4,927,316 | 5/1990 | Kordel | 414/510 |
| 4,966,275 | 10/1990 | Hallstrom, Jr. | 198/750 |
| 5,009,564 | 4/1991 | Lutz et al. | 414/510 |

FOREIGN PATENT DOCUMENTS

| | | | |
|---|---|---|---|
| 190397 | 7/1956 | Fed. Rep. of Germany . | |
| 112837 | 7/1983 | Japan | 414/517 |
| 406068 | 7/1966 | Switzerland | 414/525.6 |
| 1437307 | 11/1988 | U.S.S.R. | 414/525.6 |
| 1558798 | 4/1990 | U.S.S.R. | 414/510 |
| 1057013 | 2/1967 | United Kingdom . | |
| 84/03686 | 9/1984 | World Int. Prop. O. | 414/525.1 |

Primary Examiner—David A. Bucci

[57] ABSTRACT

A cargo carrying vehicle including a body; one or more movable support surfaces mounted on the internal floor of the body for movement relative thereto; drive apparatus for moving each one of the one or more movable support surfaces back and forth between a first position and a second position spaced longitudinally from the first position; a movable bulkhead mounted in the interior of the body above the one or more movable support surfaces for movement relative to the internal floor; and drive apparatus for moving the movable bulkhead back and forth between a first position and a second position spaced longitudinally from the first position.

7 Claims, 15 Drawing Sheets

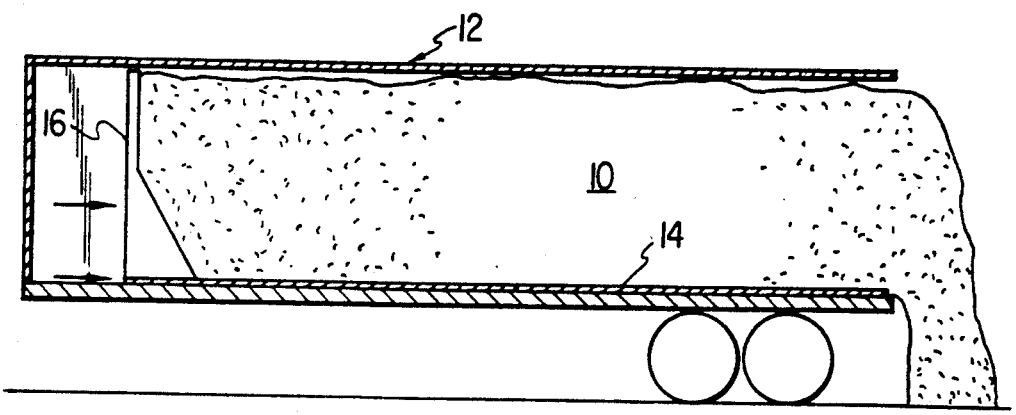
FIG.1 PREVIOUS INVENTION
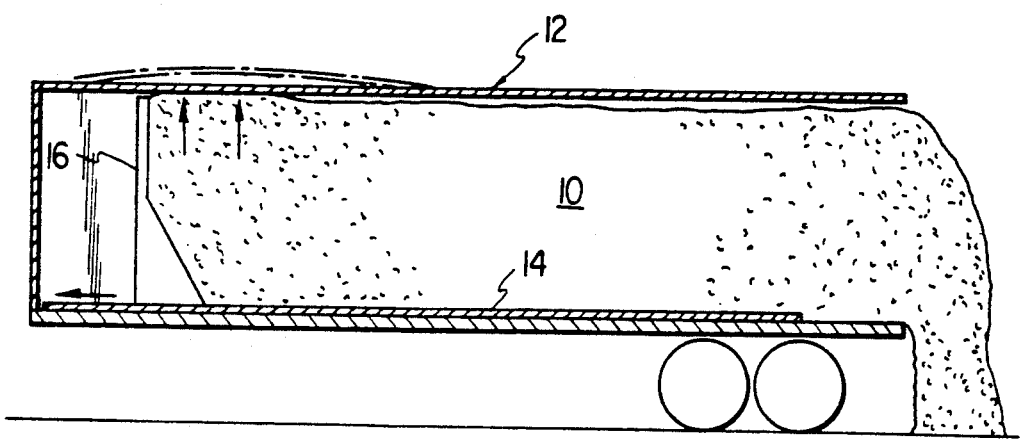
FIG.2 PREVIOUS INVENTION
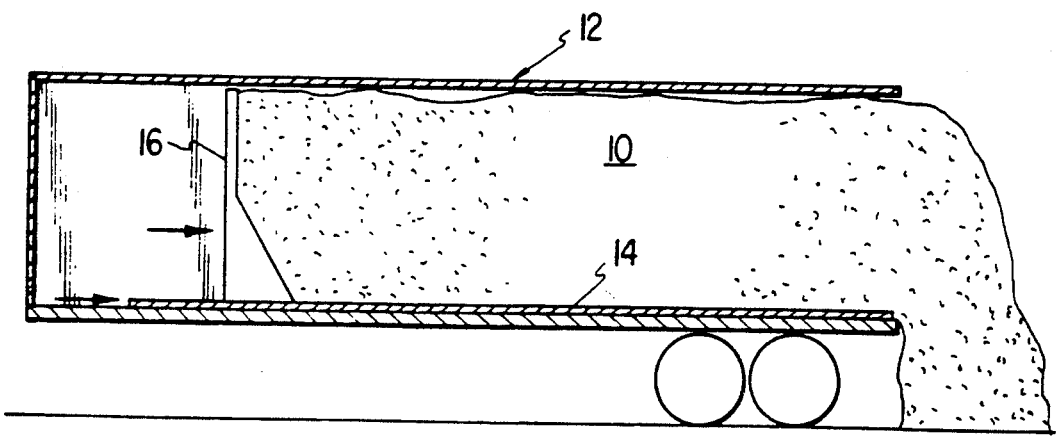
FIG.3 PREVIOUS INVENTION

PREVIOUS INVENTION

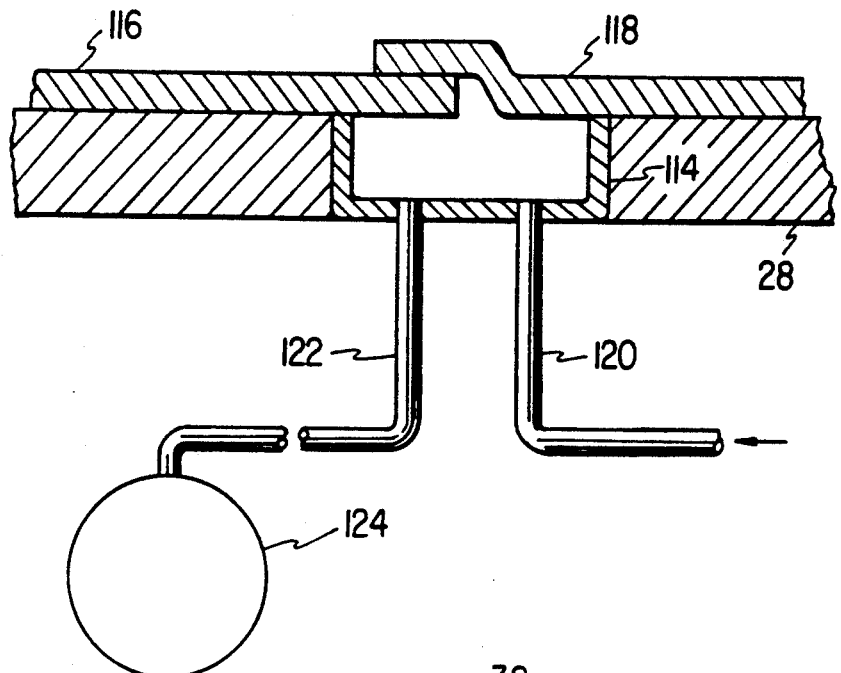
FIG.33
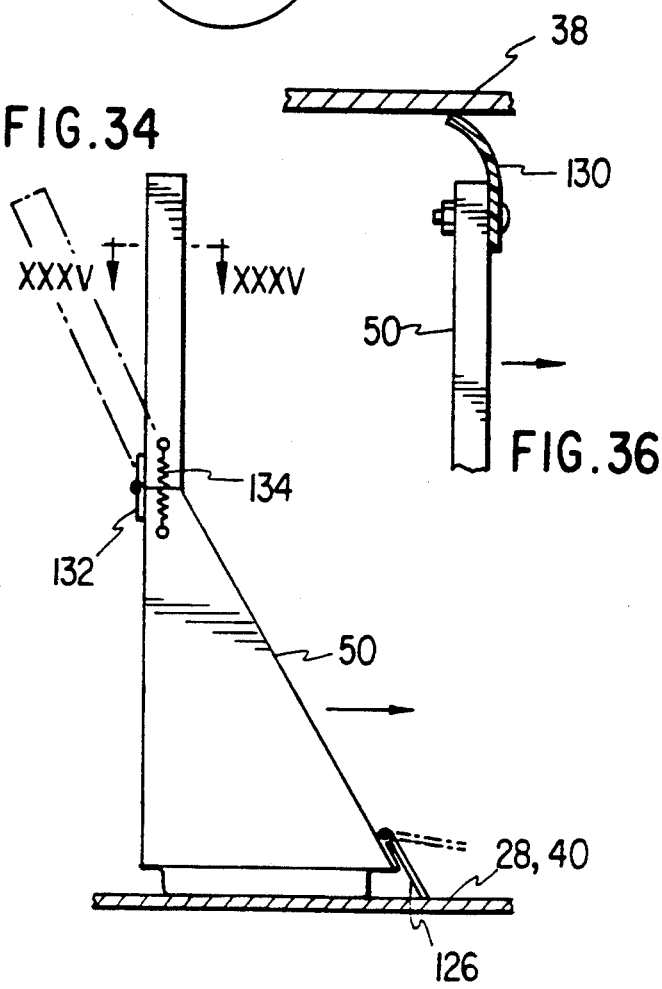
FIG.34
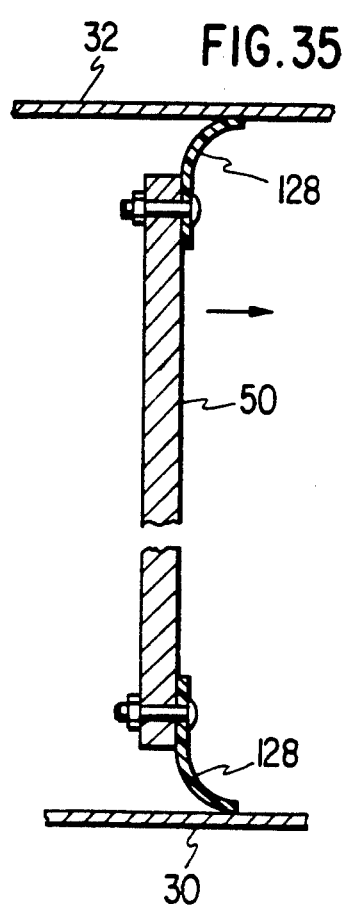
FIG.35
FIG.36

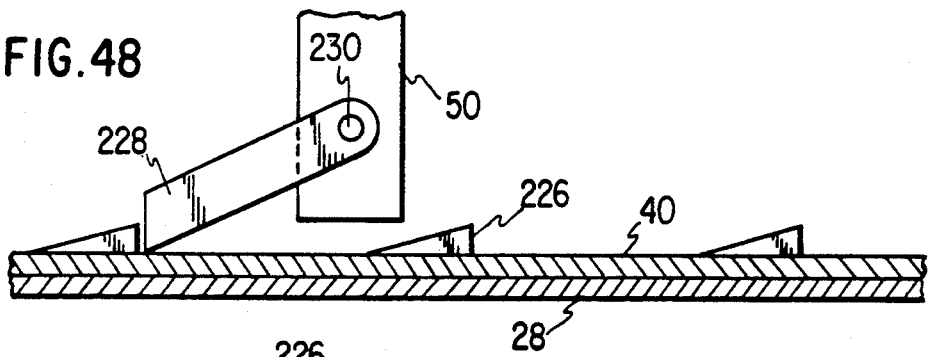
FIG. 48
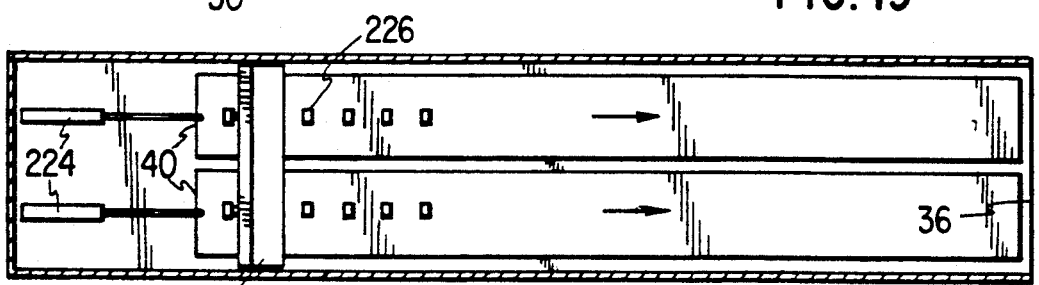
FIG. 49
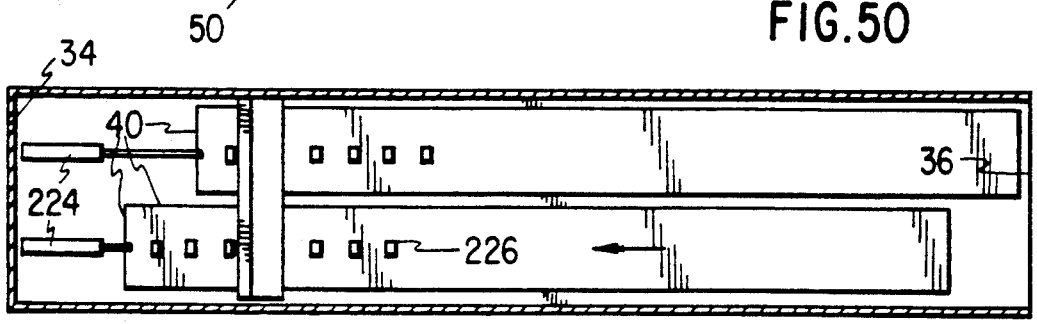
FIG. 50
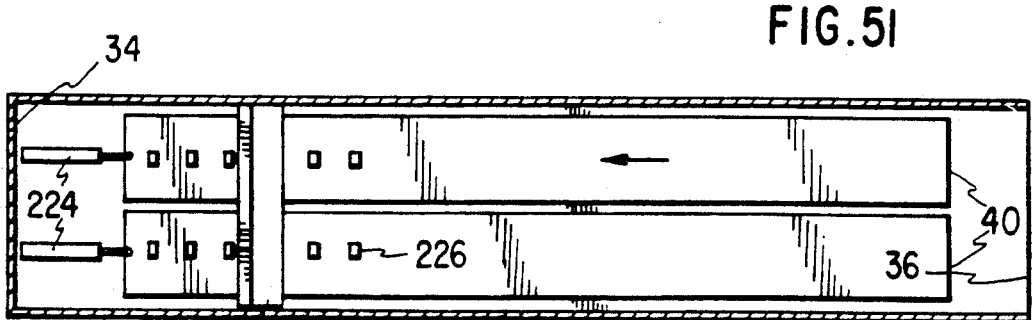
FIG. 51
FIG. 52

5,314,290

CARGO CARRYING VEHICLE HAVING A MOVABLE BULKHEAD LOCATED THEREIN

FIELD OF THE INVENTION

This invention pertains to cargo carrying vehicles having unloading means located in the interior thereof.

CROSS-REFERENCE TO RELATED APPLICATION

This application is related to our pending application Ser. No. 07/731,202, filed Jul. 11, 1991, now abandoned.

BACKGROUND OF THE INVENTION

This invention is an improvement on the invention disclosed in our prior U.S. Pat. No. 5,009,564, issued Apr. 23, 1991. The disclosure of that prior patent is hereby incorporated herein by reference.

The invention disclosed in our prior patent and other devices of this general type suffered from a drawback which we will now explain with reference to FIGS. 1-5 and 21.

FIGS. 1-3 and 21 show the invention disclosed in our prior patent. A device of this character is designed to unload a load of generally solid, but discrete, matter 10 (such as garbage or sand) from a trailer 12. Unloading is effected in steps by the combined use of a movable floor 14 and a movable bulkhead 16. Unloading is begun by opening a rear door (not shown). Then the movable floor 14 and the movable bulkhead 16 move backwardly together by one increment under control of drive means not shown, thereby ejecting a first increment of the matter 10 as shown in FIG. 1. Since the movable floor 14 and the movable bulkhead 16 move together in the first step, there is relatively little tendency for the matter 10 to press outwardly against the sides of the trailer 12 or upwardly against the roof of the trailer 12. In the next step, however, the movable floor 14 is moved toward the front of the truck 12 while the movable bulkhead 16 is held in place. This causes the matter 10 to compact and to exert considerable upward pressure on the roof of the trailer 12 (as shown in FIG. 2) and considerable sideward pressure on the sides of the trailer 12 (as shown in FIG. 5 for the prior art). The upward and outward pressures can damage the trailer 12. FIG. 3 shows the next step of the cycle, during which the movable floor 14 and the movable bulkhead 16 again move backwardly together by one increment, ejecting a second increment of the matter 10.

FIGS. 4 and 5 show the prior art that preceded our previous invention. In this prior art, matter 18 (such as garbage or sand) is unloaded from a trailer 20 by means of a movable bulkhead 22, but there is no movable floor. Since the floor is stationary relative to the movable bulkhead 22, the matter 18 tends to compact and press upwardly on the roof of the trailer 20 (as shown in FIG. 4) and outwardly on the sides of the trailer 20 (as shown in FIG. 5) as the movable bulkhead 22 moves backwardly, thereby stressing and sometimes damaging the trailer 20.

OBJECTS

It is the principal object of this invention to overcome or, at least, substantially ameliorate the problem of compacted matter in the trailer pressing outwardly on the sides and/or the roof of the trailer.

It is an additional object of this invention to provide additional means for moving and holding in place the movable bulkhead and the movable floor(s) in a device of the type disclosed in our prior patent.

SUMMARY OF THE INVENTION

In its broadest aspect, the invention comprises a cargo carrying vehicle comprising a body; one or more movable support surfaces mounted on the internal floor of the body for movement relative thereto; first means for moving each one of the one or more movable support surfaces back and forth between a first position and a second position spaced longitudinally from the first position; a movable bulkhead mounted in the interior of the body above the one or more movable support surfaces for movement relative to the internal floor; and second means for moving the movable bulkhead back and forth between a first position and a second position spaced longitudinally from the first position.

BRIEF DESCRIPTION OF THE DRAWINGS

FIG. 1 shows the invention shown in our prior patent at the beginning of an unloading cycle—that is, while the movable floor and the movable bulkhead are moving backwardly together.

FIG. 2 shows the invention shown in our prior patent in the second step of an unloading cycle—that is, with the movable bulkhead held stationary and the movable floor moving forwardly.

FIG. 3 shows the invention shown in our prior art in the third step of an unloading cycle—that is, with the movable floor and the movable bulkhead again moving backwardly together.

FIG. 33 shows a surface-to-surface seal in combination with a drainage gutter suitable for use with any of the embodiments of the present invention.

FIG. 34 is a cross-sectional view of a breakaway movable bulkhead.

FIG. 35 is a view on an enlarged scale along the line XXXV—XXXV in FIG. 34.

FIG. 36 is a cross-sectional longitudinal view of the top of the movable bulkhead.

FIG. 48 is a longitudinal cross-sectional view of a ninth drive system for the movable bulkhead.

FIGS. 49–52 are planar cross-sectional views of the ninth drive system for the movable bulkhead in various stages of its movement.

DETAILED DESCRIPTION OF THE PRESENTLY PREFERRED EMBODIMENTS

The First Embodiment

Figure 4:
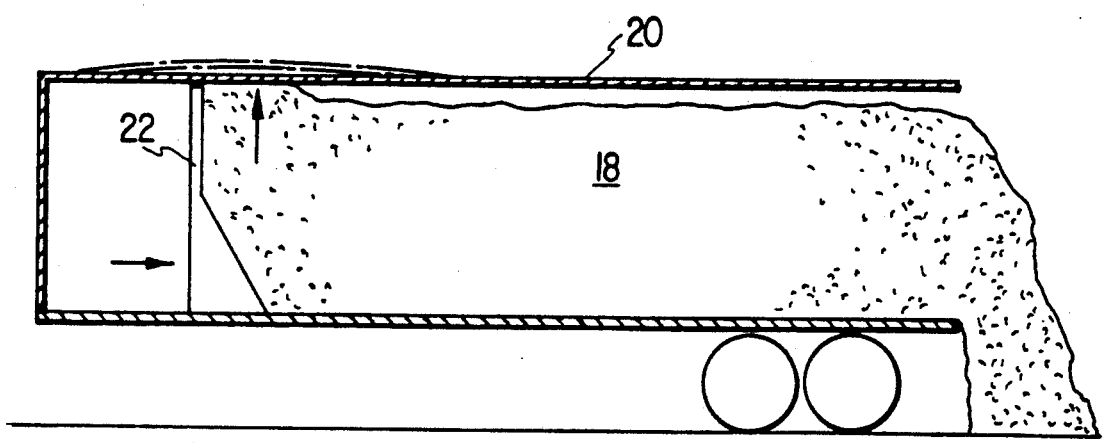
FIG. 4 is a side view of a prior art device having a movable bulkhead but no movable floor unloading a load of particulate matter.
Figure 5:
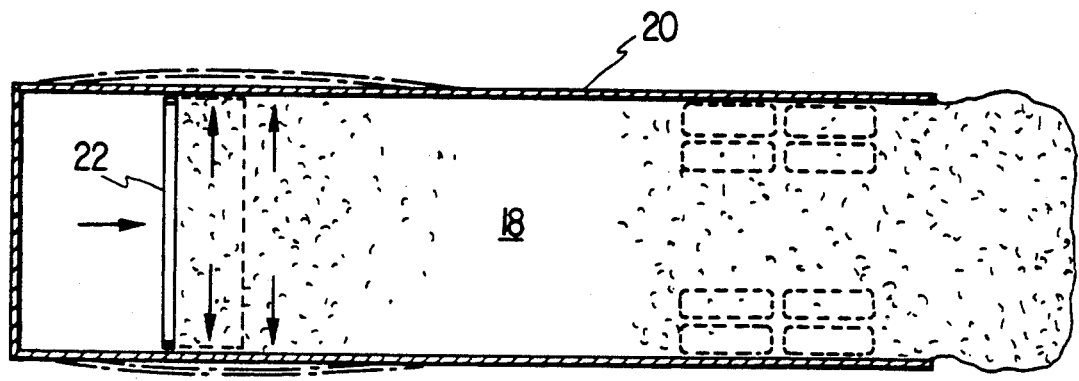
FIG. 5 is a top view of the prior art device shown in FIG. 4 at the same point in the unloading cycle.
Figure 6:
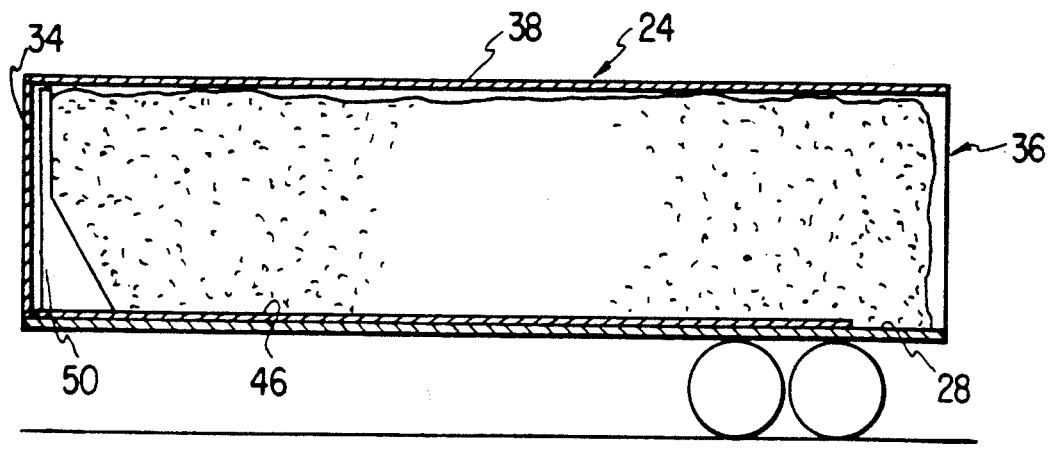
FIG. 6 is a side cross-sectional view of a first embodiment of the present invention at the beginning of an unloading cycle.
Figure 7:
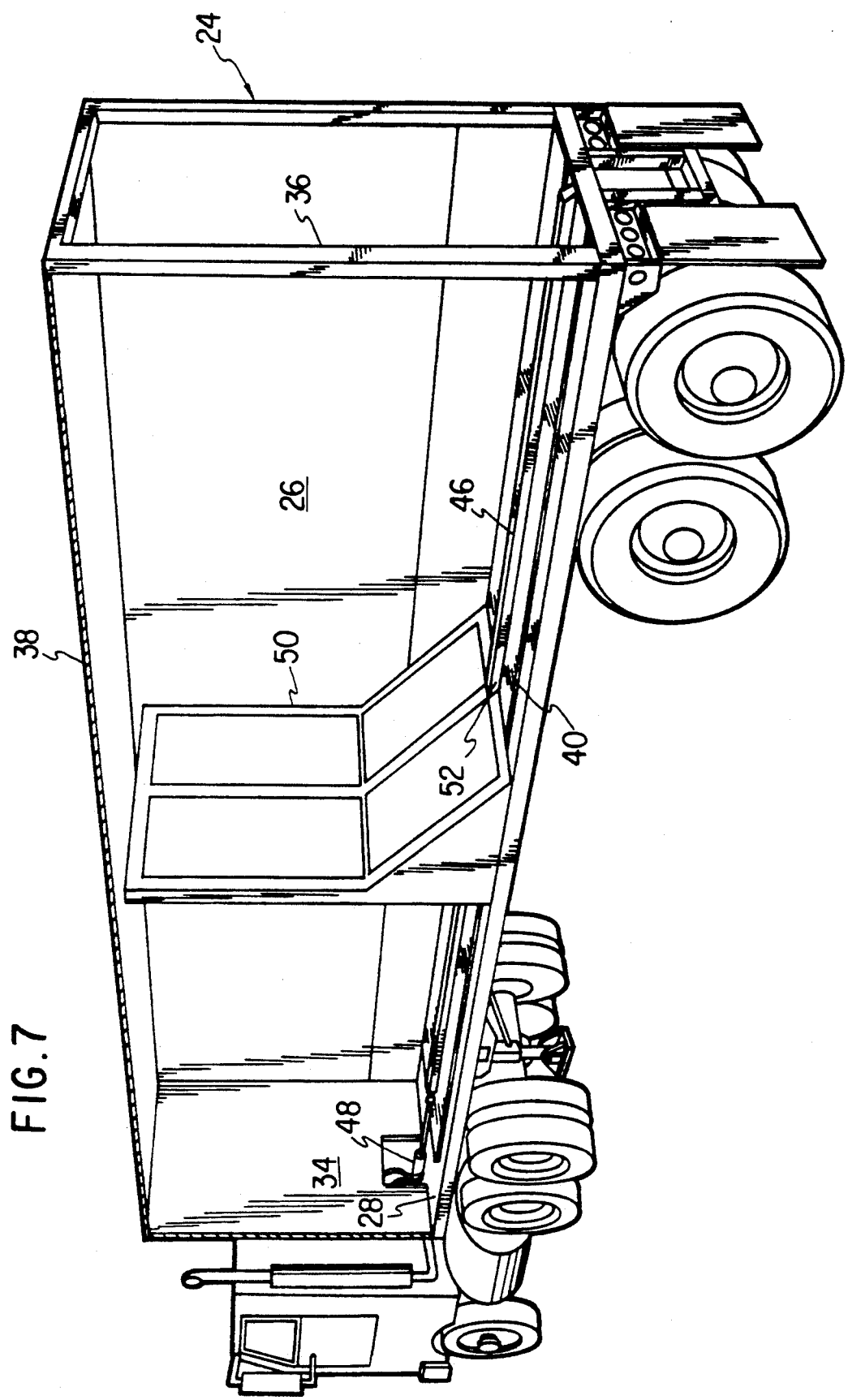
FIG. 7 is a perspective view of the first embodiment of the present invention.
Figure 8:
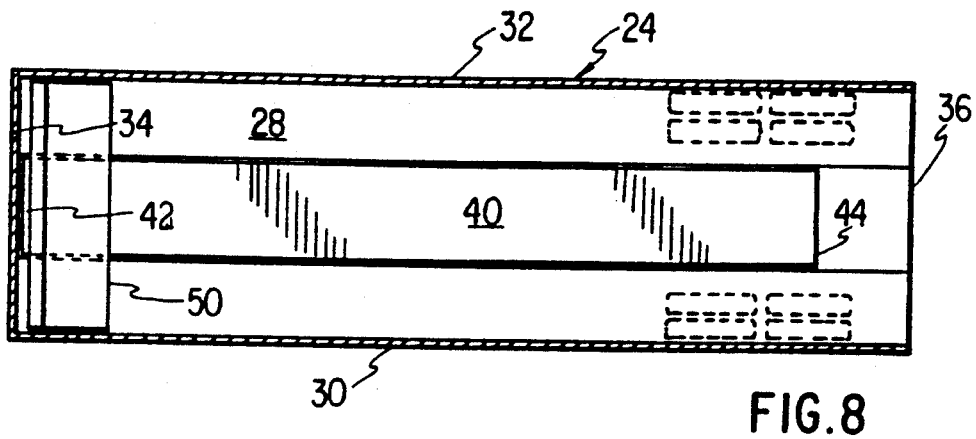
FIG. 8 is a top cross-sectional view of the first embodiment of the present invention at the beginning of an unloading cycle.
Figure 9:
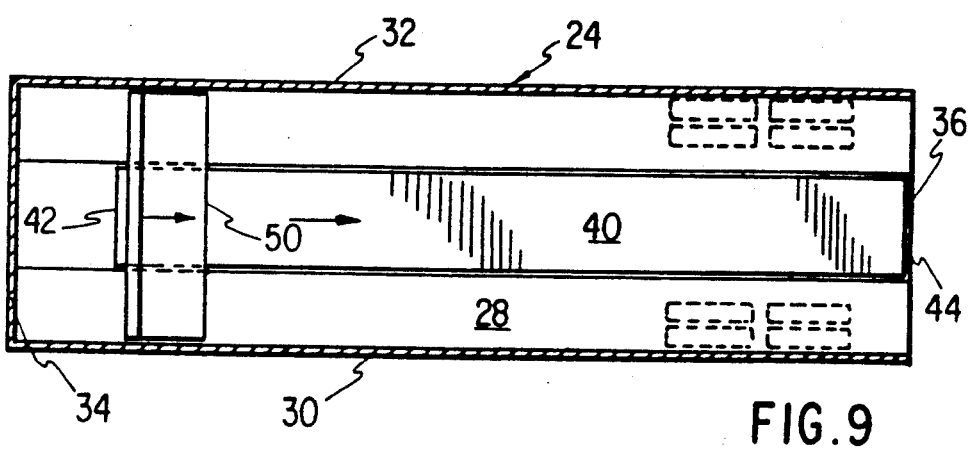
FIG. 9 is a top cross-sectional view of the first embodiment of the present invention during the first step of an unloading cycle.
Figure 10:
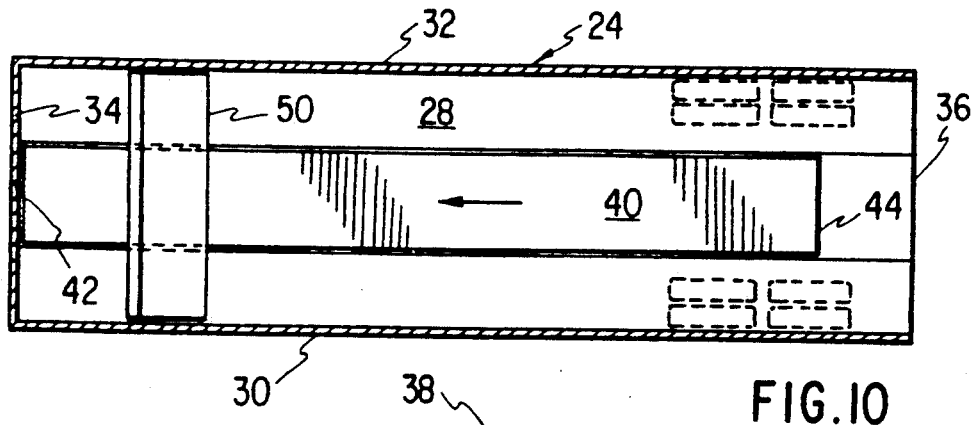
FIG. 10 is a top cross-sectional view of the first embodiment of the present invention during the second step of an unloading cycle.

The first embodiment of the present invention is shown in FIGS. 6–10 and 16. Those figures show a cargo carrying vehicle (which, in the illustrated embodiment, is a trailer, but which might be a truck or other type of cargo carrying vehicle) comprising a generally rectangular parallelepipedal body 24. The body 24 has an interior 26, an internal floor 28, a left internal sidewall 30, a right internal sidewall 32, a front end 34, a rear end 36, and a roof 38.

A movable support surface 40 is mounted in the interior 26 on the internal floor 28 for movement relative thereto. The movable support surface 40 has a front end 42 and a rear end 44. The width of the movable support surface 40 is preferably at least approximately half the width of the internal floor 28, and the movable support surface 40 is preferably centrally positioned relative to the left internal sidewall 30 and the right internal sidewall 32. Accordingly, a strip of the internal floor 28 equal to at least approximately one quarter of the width of the interior 26 is exposed on either side of the movable support surface 40. The movable support surface 40 preferably has a central, longitudinally extending stiffening rail 46. The stiffening rail 46 can extend upwardly (as shown), or it can extend downwardly to be received in a corresponding slot in the internal floor 28.

Longitudinal movement of the movable support surface 40 is effected by any appropriate means, including those shown in our prior patent and those disclosed hereinafter. In the illustrated embodiment, longitudinal movement is effected by a fluidic ram 48 one end of which is coupled to the stiffening rail 46.

A movable bulkhead 50 is mounted in the interior 26 above the movable support surface 40 for movement relative to the internal floor 28. If the movable support surface 40 has an upwardly extending stiffening rail 46, a corresponding longitudinal slot 52 is provided in the movable bulkhead 50.

Longitudinal movement of the movable bulkhead 50 is effected by any appropriate means, including those shown in our prior patent and those disclosed hereinafter.

The Second Embodiment

Figure 11:
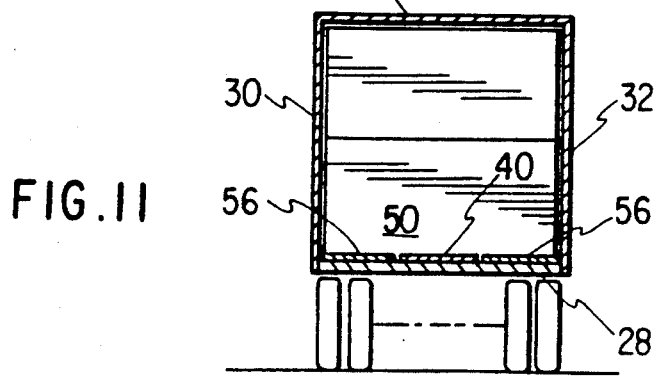
FIG. 11 is a transverse cross-sectional view of a second embodiment of the present invention.
Figure 12:
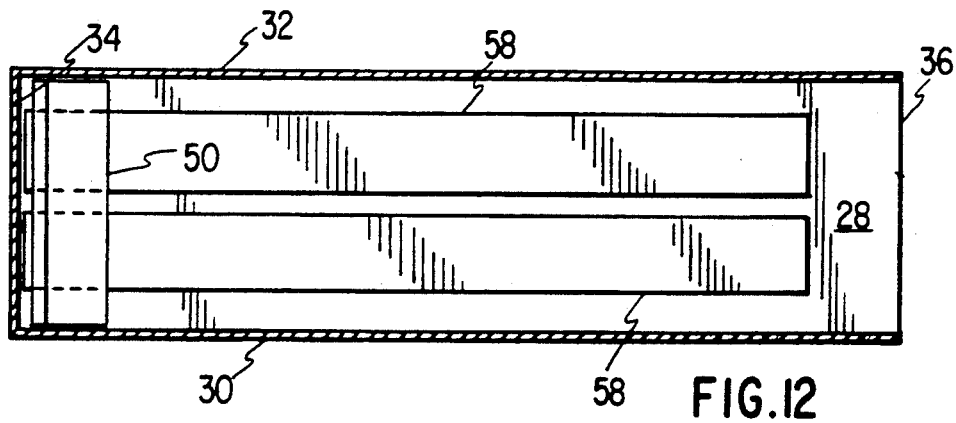
FIG. 12 is a top cross-sectional view of a third embodiment of the present invention at the beginning of an unloading cycle.
Figure 13:
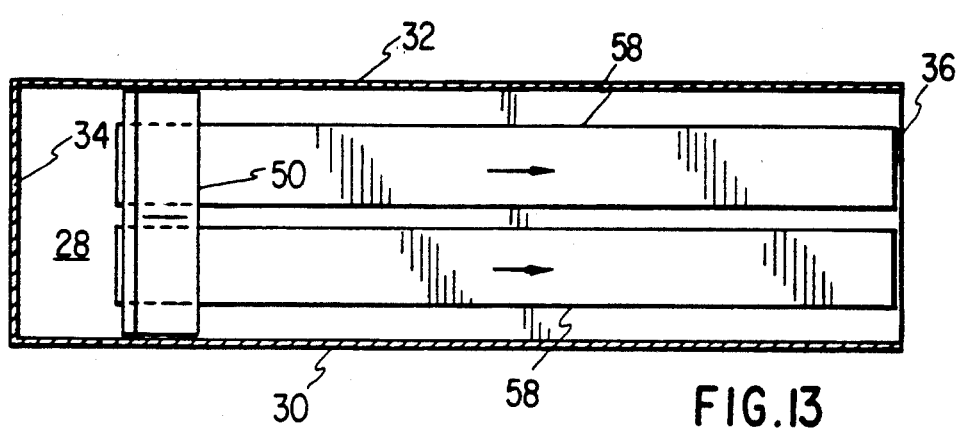
FIG. 13 is a top cross-sectional view of the third embodiment of the present invention during the first step of an unloading cycle.
Figure 14:
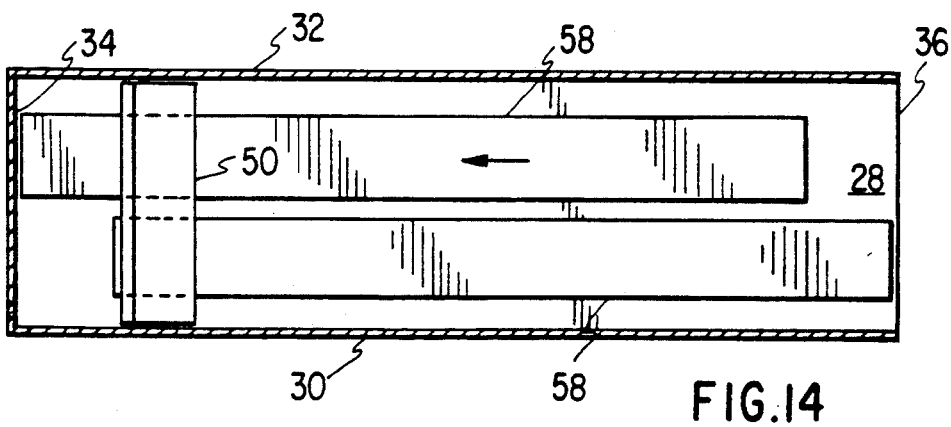
FIG. 14 is a top cross-sectional view of the third embodiment of the present invention during the second step of an unloading cycle.
Figure 15:
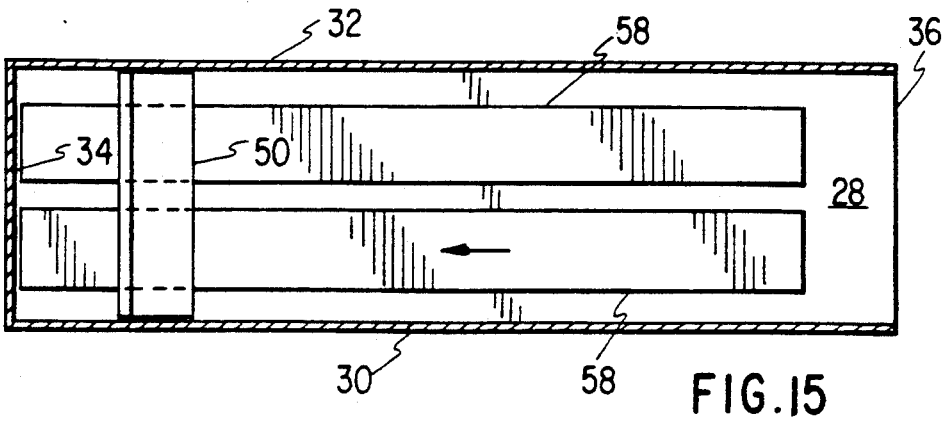
FIG. 15 is a top cross-sectional view of the third embodiment of the present invention during the third step of an unloading cycle.
Figure 16:
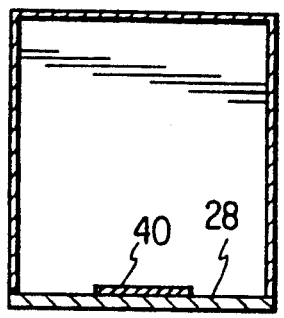
FIG. 16 is a transverse cross-sectional view of the first embodiment of the present invention.
Figure 17:
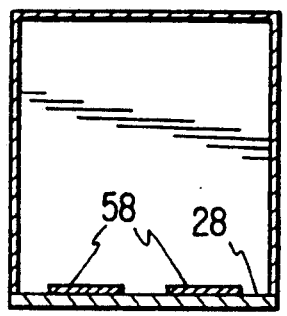
FIG. 17 is a transverse cross-sectional view of the third embodiment of the present invention.

The second embodiment of the present invention is shown in FIG. 11. It is similar to the first embodiment, and consequently only the differences between the first and second embodiments will be described here.

In addition to the internal floor 28 and the movable support surface 40, the second embodiment comprises a left ancillary support surface 54 mounted on the internal floor 28 between the movable support surface 40 and the left internal sidewall 30 and a right ancillary support surface 56 mounted on the internal floor 28 between the movable support surface 40 and the right internal sidewall 32. The left ancillary support surface 54 and the right ancillary support surface 56 are sized, shaped, and positioned so that, as shown in FIG. 11, the bottom surface of the interior 26 is at least approximately flat in transverse cross-section.

The left ancillary support surface 54 and the right ancillary support surface 56 may not reciprocate. Preferably, however, they do. That is, longitudinal movement of the left and right ancillary support surfaces 54, 56 is preferably effected by any appropriate means, including those shown in our prior patent and those disclosed hereinafter.

The materials of which the movable support surface 40 and the ancillary support surfaces 54 and 56 are made and the ratio of the surface area of the movable support surface 40 to the surface area of the ancillary support surfaces 54 and 56 are selected so that, for the type and weight of load for which the cargo carrying vehicle is designed, the frictional forces between the load and the movable support surface 40 and between the load and the ancillary support surfaces 54 and 56 during movement of the movable support surface 40 are at least approximately equal, thus creating an at least substantially neutral frictional condition for the load as a whole. The balance may be designed to be as nearly neutral as possible or it may be designed to provide a slight forward bias to the load or a slight rearward bias to the load.

The Third Embodiment

The third embodiment of the present invention is shown in FIGS. 12–15 and 17. It is similar to the first embodiment, and consequently only the differences between the first and third embodiments will be described here.

In the third embodiment, there are two movable support surfaces 58 mounted in the interior 26 on the internal floor 28 for movement relative thereto. The total width of the two movable support surfaces 58 is preferably at least approximately half the width of the internal floor 28. The movable support surface 58 may be spaced transversely, as shown, or they may be immediately adjacent to each other. In either case, the total width of the internal floor 28 that is exposed in a transverse section that includes both of the movable support surfaces 58 is also preferably at least approximately half the width of the internal floor 28.

Longitudinal movement of the movable support surfaces 58 is effected by any appropriate means, including those shown in our prior patent and those disclosed hereinafter.

The materials of which the movable support surfaced 58 and the internal floor 28 are made and the ratio of the surface area of the movable support surfaces 58 to the surface area of the internal floor 28 are also selected so that, for the type and weight of load for which the cargo carrying vehicle is designed, the frictional forces between the load and the movable support surface 58 and between the load and the internal floor 28 during movement of the movable support surfaces 58 are at least approximately equal, thus creating an at least substantially neutral frictional condition for the load as a whole. The balance may be designed to be as nearly neutral as possible or it may be designed to provide a slight forward bias to the load or a slight rearward bias to the load.

The Fourth Embodiment

Figure 18:
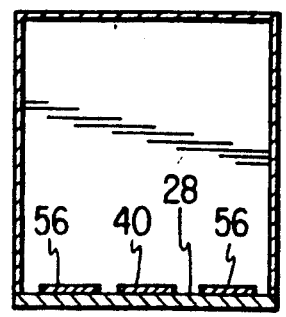
FIG. 18 is a transverse cross-sectional view of a fourth embodiment of the present invention.

The fourth embodiment of the invention is shown in FIG. 18. It is similar to the second embodiment except that the various support surfaces do not abut, leaving strips of the internal floor 28 visible between them.

The Fifth Embodiment

Figure 19:
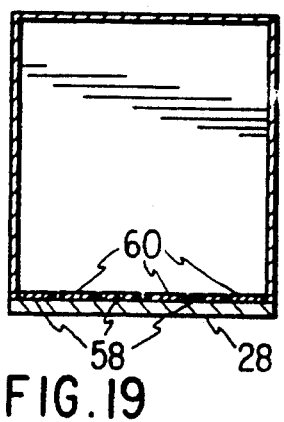
FIG. 19 is a transverse cross-sectional view of a fifth embodiment of the present invention.

The fifth embodiment of the invention is shown in FIG. 19. The fifth embodiment of the invention is to the third embodiment of the invention as the second embodiment of the invention is to the first embodiment of the invention. That is, in addition to the movable support surfaces 58 (which are shown as numbering three in this embodiment), a plurality of ancillary support surfaces 60 are provided.

The Sixth Embodiment

Figure 20:
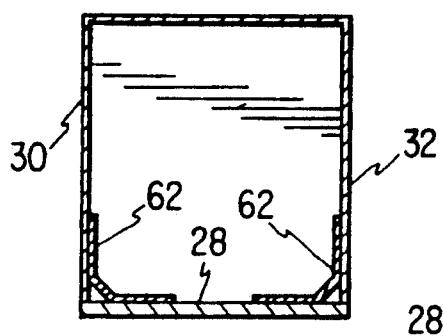
FIG. 20 is a transverse cross-sectional view of a sixth embodiment of the present invention.
Figure 21:
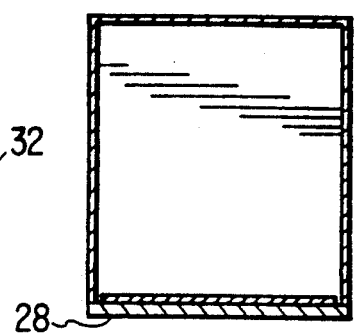
FIG. 21 is a transverse cross-sectional view of the invention disclosed in our prior patent.

The sixth embodiment is shown in FIG. 20. It is similar to the third embodiment except that it has two movable support surfaces 62 each of which comprises a first segment that slides on the internal floor 28 and a second segment that slides on the adjacent one of the left and right internal sidewalls 30, 32. Of course, all of the movable support surfaces (including, but not limited to, the movable support surfaces 62) can be divided into two or more transversely spaced, individually movable support surfaces.

The Seventh Embodiment

Figure 22:
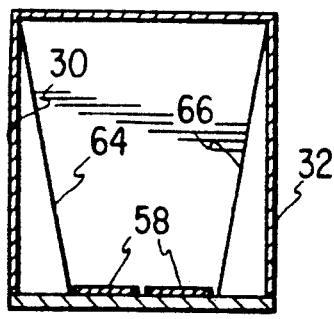
FIG. 22 is a transverse cross-sectional view of a seventh embodiment of the present invention.

The seventh embodiment of the invention is shown in FIG. 22. It is similar to the second embodiment except that left and right ramps 64, 66, each of which slopes downwardly and inwardly, have been provided to bias the matter 18 toward the two movable support surfaces 58.

The Eighth Embodiment

Figure 23:
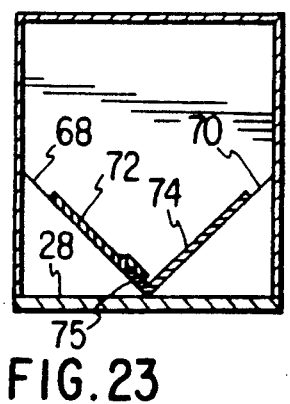
FIG. 23 is a transverse cross-sectional view of an eighth embodiment of the present invention.

The eighth embodiment of the invention is shown in FIG. 23. In this embodiment, a left ramp 68 and a right ramp 70 nearly meet at the longitudinal center line of the internal floor 28, and a left movable support surface 72 and a right movable support surface 74 do meet and actually overlap one another. A seal 75 is preferably disposed between the left movable support surface 72 and the right movable support surface 74.

The Ninth Embodiment

Figure 24:
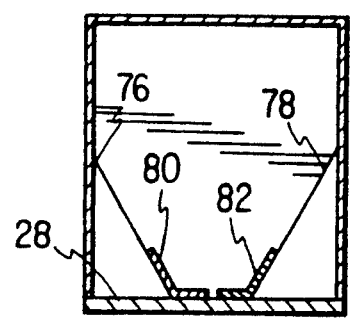
FIG. 24 is a transverse cross-sectional view of a ninth embodiment of the present invention.

The ninth embodiment of the invention is shown in FIG. 24. In this embodiment, there is a left ramp 76 and a right ramp 78, but their lower edges are substantially spaced. There is a left movable support surface 80 and a right movable support surface 82, each comprising a first segment that slides on the internal floor 28 and a second segment that slides on the corresponding one of the left and right ramps 76 and 78.

The Tenth Embodiment

Figure 25:
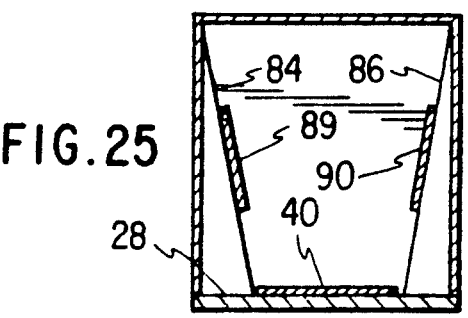
FIG. 25 is a transverse cross-sectional view of a tenth embodiment of the present invention.

The tenth embodiment of the invention is shown in FIG. 25. In this embodiment, there is a left ramp 84 and a right ramp 86 the lower edges of which are substantially spaced. There is a movable support surface 40 mounted on the internal floor 28, and there is a left ancillary movable support surface 88 mounted on the left ramp 84 and a right ancillary movable support surface 90 mounted on the right ramp 86.

Operation of the Embodiments Comprising Ancillary Support Surfaces

In operation, the support surfaces and the ancillary support surfaces can be simultaneously moved in the opposition directions. If the surface areas and frictional characteristics of the support surfaces and the ancillary support surfaces are chosen correctly, the forces imparted to the loads by movement of the support surfaces and the ancillary support surfaces can be balanced, thereby permitting the load to be moved easily and without creating either side pressures or vertical pressures by movement of the movable bulkhead.

Seals For Adjacent Support Surfaces

A principal contemplated use for cargo carrying vehicles of the type disclosed herein is as a garbage truck. Loads of garbage frequently exude streams of foul smelling liquid. It is, therefore, desirable to prevent the liquids from seeping out of the garbage truck as they travel.

FIGS. 26-32 show a variety of seals that can be used between adjacent parts (such as movable support surfaces, ancillary movable support surfaces, and strips of the internal floor 28) to prevent leakage of the content of the body 24.

Figures 26, 27:
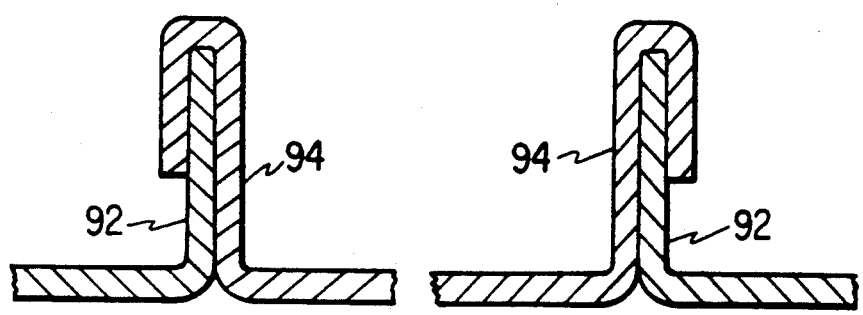
FIG. 26 shows a labyrinth seal suitable for use with any of the embodiments of the present invention.
FIG. 27 shows a labyrinth seal suitable for use with any of the embodiments of the present invention.

FIGS. 26 and 27 are left- and right-hand versions of the same labyrinth seal. In each case, a first segment 92 is upturned and a second segment 94 is upturned and doubled back over the upturned edge of the first segment 92. The design of this seal means that the material 18 must overcome gravity (i.e., more upwardly between the first segment 92 and the second segment 94) in order to leak out. Either or both of the first and second segments 92 and 94 can be movable.

Figures 28, 29:
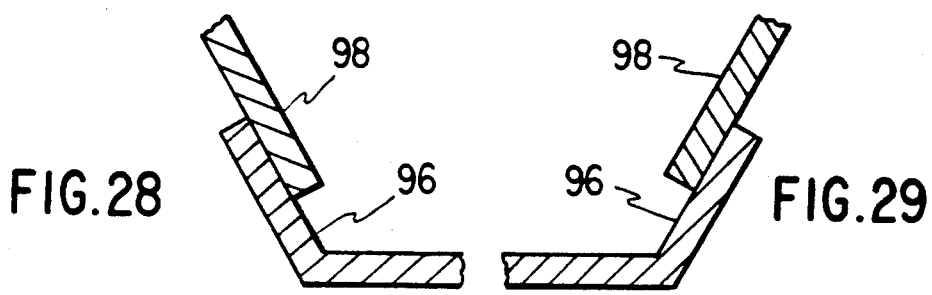
FIG. 28 shows a shingle seal suitable for use with any of the embodiments of the present invention.
FIG. 29 shows a shingle seal suitable for use with any of the embodiments of the present invention.

FIGS. 28 and 29 are left- and right-hand versions of the same shingle seal. In each case, a first segment 96 is sloped upwardly, and a second segment 98 is sloped downwardly and overlaps the first segment 96 so as to prevent (or severely impede) egress of the load between the two segments. Again, the design of this seal means that the material 18 must overcome gravity in order to leak out. Either or both of the first and second segments 96 and 98 can be movable.

Figure 30:
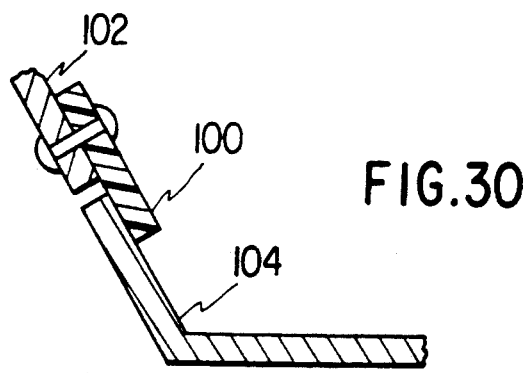
FIG. 30 shows a flap seal suitable for use with any of the embodiments of the present invention.

FIG. 30 shows a flap seal 100 riveted to a first segment 102 and overlapping a second segment 104 so as to prevent (or severely impede) egress of the load between the two segments. Again, the design of this seal means that the material 18 must overcome gravity in order to leak out. Either or both of the first and second segments 102 and 104 can be movable.

Figure 31:
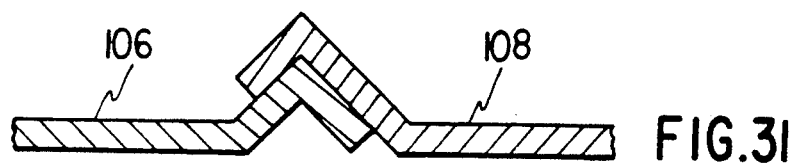
FIG. 31 shows a labyrinth seal suitable for use with any of the embodiments of the present invention.

FIG. 31 shows another labyrinth seal. A first segment 106 is bent twice along longitudinal lines, and a second segment 108 is bent twice along longitudinal lines so as to mate with the first segment 106. Again, the design of this seal means that the material 18 must overcome gravity in order to leak out. Either or both of the first and second segments 106 and 108 can be movable.

Figure 32:
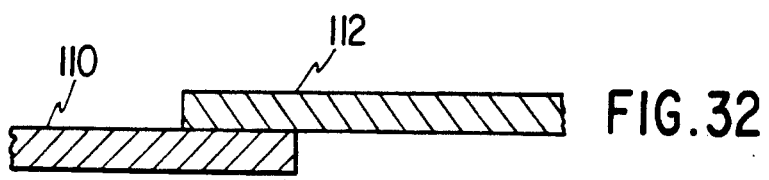
FIG. 32 shows a surface-to-surface seal suitable for use with any of the embodiments of the present invention.

FIG. 32 shows a simple surface-to-surface seal. A first segment 110 is overlapped by a second segment 112, and the surface-to-surface overlap constitutes a simple seal. Either or both of the first and second segments 110 and 112 can be movable.

FIG. 33 shows a surface-to-surface seal in combination with a drainage gutter 114. As with FIG. 32, a first segment 116 is overlapped by a second segment 118, and the surface-to-surface overlap constitutes a simple seal. However, such a seal is far from perfect, and the drainage gutter 114 is provided to catch liquid that leaks through the surface-to-surface seal. A source of compressed air 120 is provided to flush the drainage gutter 114 through a conduit 122 into a storage tank 124, from which it can be drained at an appropriate time and place.

Seals for the Movable Bulkhead

It is also desirable to impede the flow of the matter 18 past the movable bulkhead 50 into the portion of the body 24 between the movable bulkhead 50 and the front end 34. However, it is also desirable not to absolutely prevent flow of the matter 18 past the movable bulkhead 50, since otherwise unacceptably high pressure can build up in the matter 18 immediately behind the movable bulkhead 50.

Consequently, it has been found desirable both to provide seals between the movable bulkhead 50 and the adjacent surfaces of the body 24 and to provide a breakaway feature in the movable bulkhead 50.

Both these features are illustrated in FIGS. 34-36.

In FIG. 34 one can see a seal 126 mounted on the movable bulkhead 50 and sweeping the bottom surface, which may be the internal floor 28, the movable support surface 40, etc. The seal 126 is preferably spring biased upwardly, so that it is forced against the bottom surface by backward motion of the movable bulkhead 50 but rides over pieces of the matter 18 stuck to the bottom surface during movement of the movable bulkhead 50 toward the front end 34 of the body 24. Alternatively, the seal 126 can be pivoted back and forth by a fluidic cylinder or the like.

In FIG. 35 one can see two seals 128 mounted on the movable bulkhead 50 and sweeping the adjacent internal sidewalls 30 and 32, respectively. It should be particularly noted that, if the pressure in the matter 18 exceeds a certain value that is a function of the resiliency of the seals 128, the seals 128 will be forced forwardly around the edges of the movable bulkhead 50, permitting the matter 18 to flow into the space between the movable bulkhead 50 and the front end 34 of the body 28.

In FIG. 36 one can see a seal 130 mounted on the movable bulkhead 50 and sweeping the roof 38. It should again be noted that, if the pressure in the matter 18 exceeds a certain value that is a function of the resiliency of the seal 130, the seal 130 will be forced away from the roof 38, permitting the matter 18 to flow into the space between the movable bulkhead 50 and the front end 34 of the body 28.

Finally, FIG. 34 shows that the movable bulkhead 50 itself is made in two vertically spaced parts, connected by a hinge 132. These components function as means for relieving excessive pressure on the movable bulkhead 50. A spring 134 biases the two parts of the movable bulkhead 50 into its normal blocking position. However, if the pressure in the matter 18 exceeds a certain value that is a function of the resiliency of the spring 134, the entire top part of the movable bulkhead 50 pivots backwardly, permitting a great mass of the matter 18 to waterfall over the movable bulkhead 50, thereby relieving the pressure.

Drive Means For The Movable Support Surfaces

Further work since we filed the application that matured into our prior patent has resulted in our design of additional drive systems for the movable support surfaces.

Figure 37:
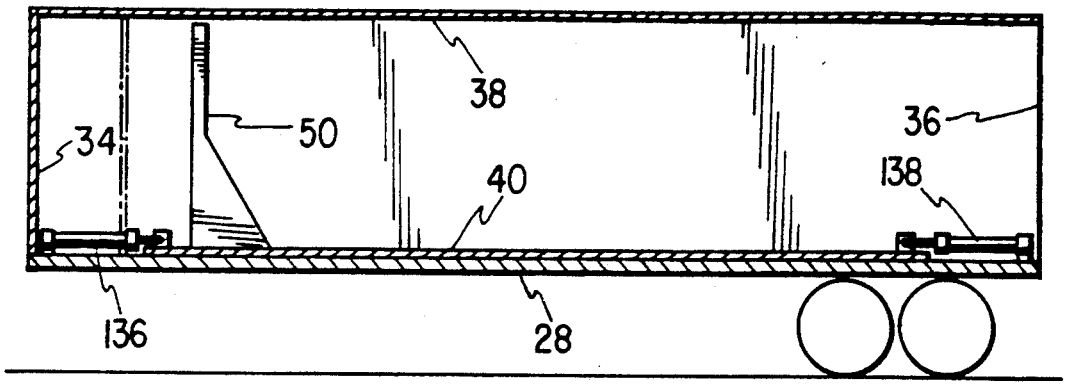
FIG. 37 is a cross-sectional view of a first drive system for the movable support surface.

In FIG. 37, the movable support surface 40 is driven reciprocatingly by a first fluidic jack 136 mounted at or near the front end 34 of the body 24 and connected to the front end 42 of the movable support surface 40 (directly, via a cable, or otherwise) and a second fluidic jack 138 mounted at or near the rear end 36 of the body 24 and connected to the rear end 44 of the movable support surface 40 (directly, via a cable, or otherwise). As the first fluidic jack 136 extends, the second fluidic jack 138 retracts, and vice versa.

Figure 38:
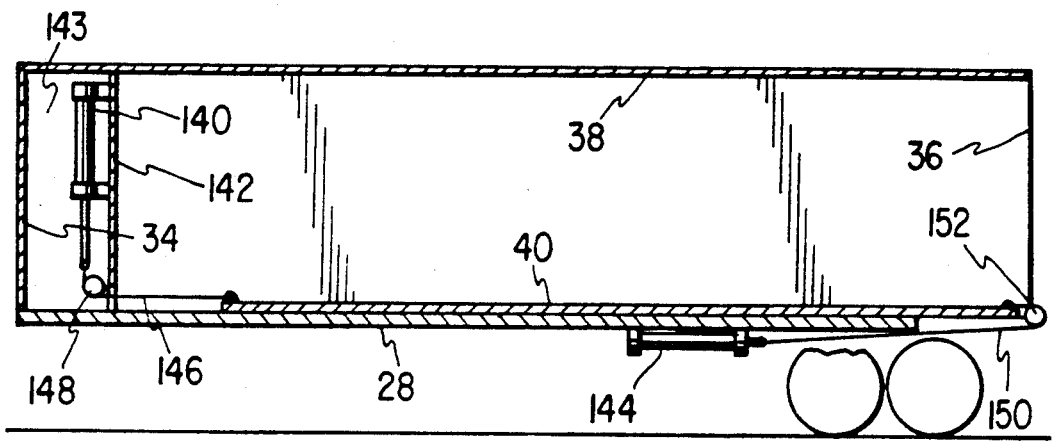
FIG. 38 is a longitudinal cross-sectional view of a second drive system for the movable support surface.

In FIG. 38, a stationary bulkhead 142 located in the body 24 near the front end of the body 24 cooperates with the internal floor 28, the left internal sidewall 30, the right internal sidewall 32, and the front end 34 to define a chamber 143 in the interior 26. The movable support surface 40 is driven reciprocatingly by a first fluidic jack 140 mounted on the stationary bulkhead 142 and a second fluidic jack 144 mounted on the underside of the internal floor 28 near the rear end 36 of the body 24. The first fluidic jack 140 is connected to the front end 42 of the movable support surface 40 by a cable 146 trained over a sheave 148, and a second fluidic jack 144 is connected to the rear end 44 of the movable support surface 40 by a cable 150 trained over a sheave 152. As the first fluidic jack 140 extends, the second fluidic jack 144 retracts, and vice versa.

Figure 39:
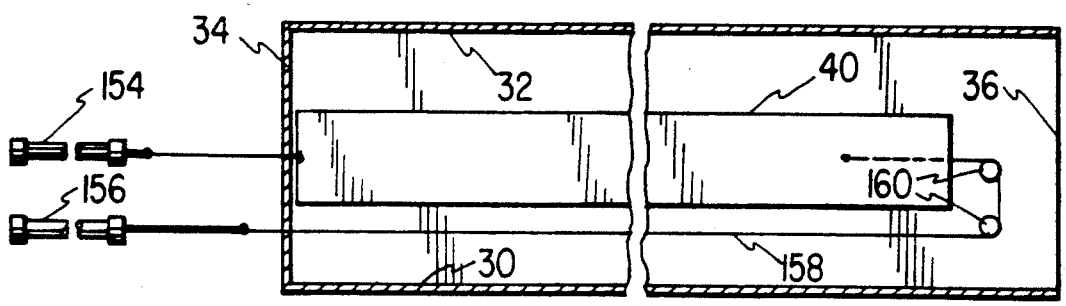
FIG. 39 is a planar cross-sectional view of a third drive system for the movable support surface.

In FIG. 39, the movable support surface 40 is driven reciprocatingly by a first fluidic jack 154 mounted in front of the front end 34 of the body 24 and a second fluidic jack 156, also mounted in front of the front end 34 of the body 24. The first fluidic jack 154 is connected to the front end 42 of the movable support surface 40 (directly, via a cable, or otherwise), and the second fluidic jack 156 is connected to the rear end 44 of the movable support surface 40 via a cable 158 that is trained over at least one (in the illustrated embodiment, two) sheave 160.

Drive Means For The Movable Bulkhead

Further work since we filed the application that matured into our prior patent has also resulted in our designing additional drive systems for the movable bulkhead.

Figure 40:
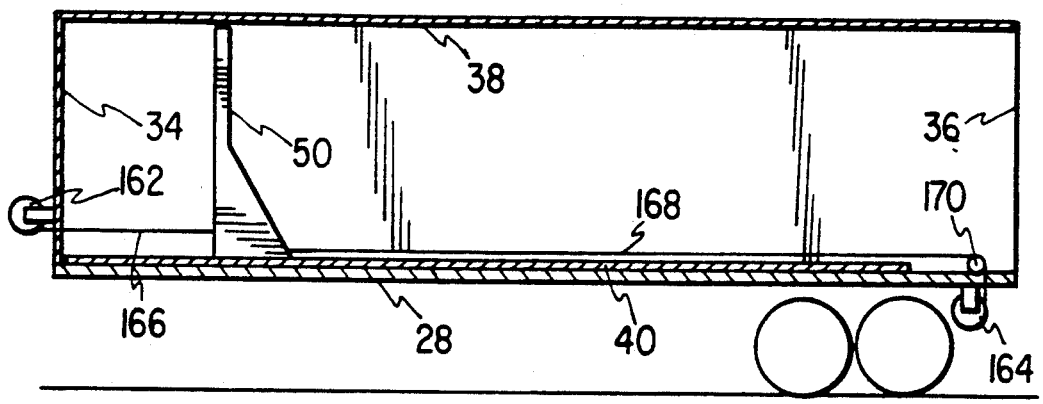
FIG. 40 is a longitudinal cross-sectional view of a first drive system for the movable bulkhead.

In FIG. 40, a first motorized winch 162 is mounted at or near the front end 34 of the body 24, and a second motorized winch 164 is mounted on the underside of the internal floor 28 at or near the rear end 36 of the body 24. The first motorized winch 164 is connected to the front surface of the movable bulkhead 50 by a first cable 166, and the second motorized winch 164 is connected to the rear surface of the movable bulkhead 50 by a second cable 168 trained over a sheave 170. As the first motorized winch 162 pays the first cable 166 out, the second motorized winch 164 winds the second cable 168 up, and vice versa.

Figure 41:
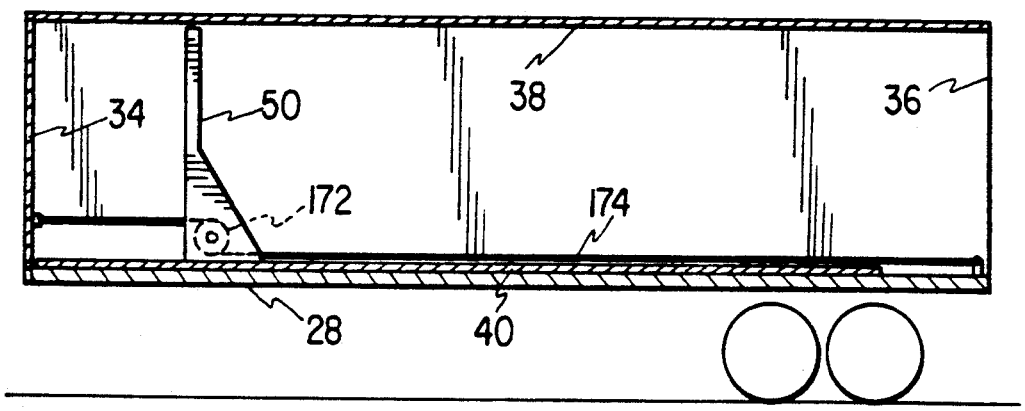
FIG. 41 is a longitudinal cross-sectional view of a second drive system for the movable bulkhead.

In FIG. 41, a motorized winch 172 is mounted in the movable bulkhead 50. A cable 174 is wound on the motorized winch 172 and connected at one end at or near to the front end 34 of the body 24 and at the other end at or near the rear end 36 of the body 24. Turning the motorized winch 172 in one direction moves the movable bulkhead 50 in one direction, while turning the motorized winch 172 in the other direction moves the movable bulkhead 50 in the other direction.

Figure 42:
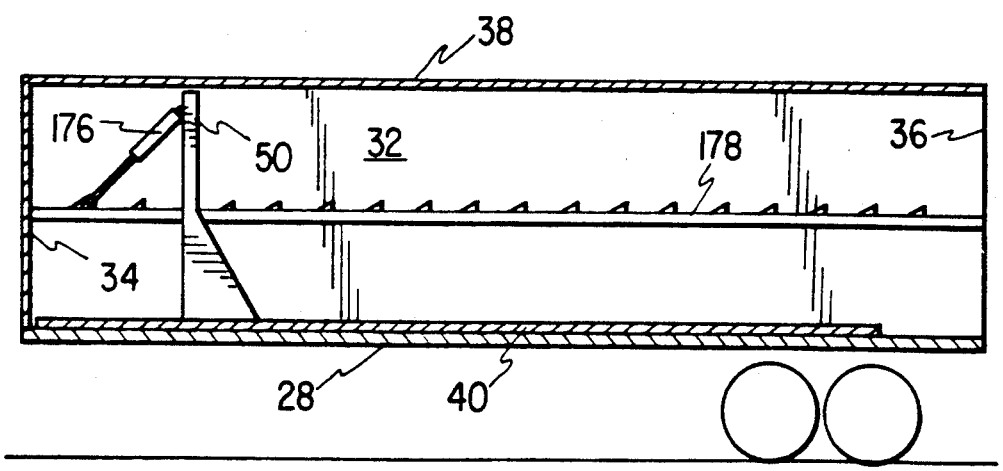
FIG. 42 is a longitudinal cross-sectional view of a third drive system for the movable bulkhead.

In FIG. 42, at least one (preferably two) fluidic jack 176 is pivotally mounted on the rear surface of the movable bulkhead 50 in position to cooperate with a rack 178 mounted on the adjacent internal sidewall 30, 32 of the body 24. In use, the fluidic jack 176 is extended, moving the movable bulkhead 50 backward by one increment, then retracted, permitting the fluidic jack 176 to swing into engagement with the next tooth of the rack 178. When the movable bulkhead 50 has reached the rear of the body 24, the movable bulkhead 50 can be returned to the front end 34 of the body 22 by any suitable means. For instance, the operator can hold the free ends of the fluidic jack(s) 176 out of engagement with the rack(s) 178 while pulling the movable bulkhead 50 forwardly by hand.

Figure 43:
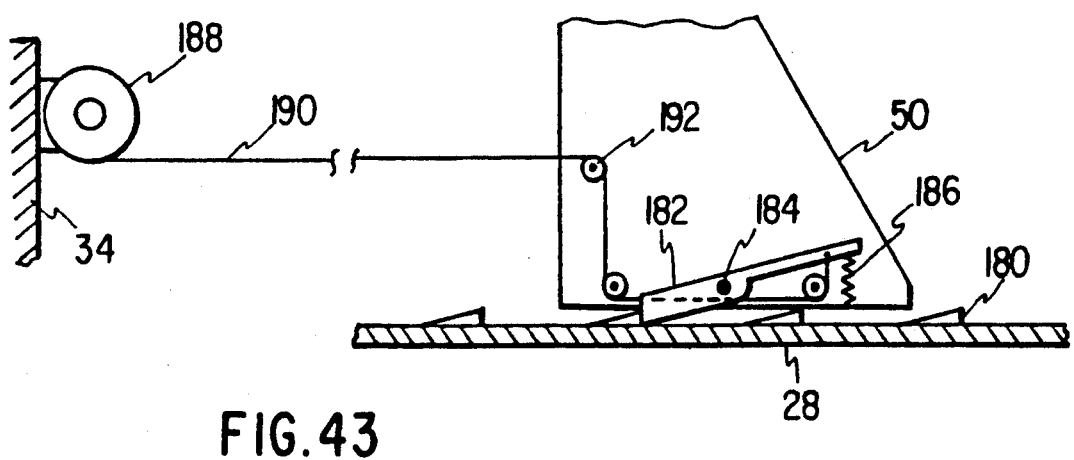
FIG. 43 is a longitudinal cross-sectional view of a fourth drive system for the movable bulkhead.

FIG. 43 shows a drive means for returning the movable bulkhead 50 to the front end 34 of the body 24. A rack 180 is provided on the upper surface of the internal floor 28. A pawl 182 is mounted for pivotal movement about an axle 184 inside the movable bulkhead 50. A compression spring 186 biases one end of the pawl 182 into engagement with the teeth of the rack 180, thereby preventing unintended forward movement of the movable bulkhead 50. A motorized winch 188 is mounted at or near the forward end 34 of the body 24. A cable 190 is wound on the motorized winch 188 and connected at the other end to the pawl 182. The cable 190 is trained over one or more (in the illustrated embodiment, three) sheaves 192 in the movable bulkhead 50 so that winding up the cable 190 causes the pawl 182 to be pivoted out of engagement with the rack 180 and the movable bulkhead 50 to be drawn forwardly in the body 24. Since the force necessary to draw the movable bulkhead 50 forwardly acts on the movable bulkhead 50 through the axle 184, it is advisable to make that axle quite sturdy.

Figure 44:
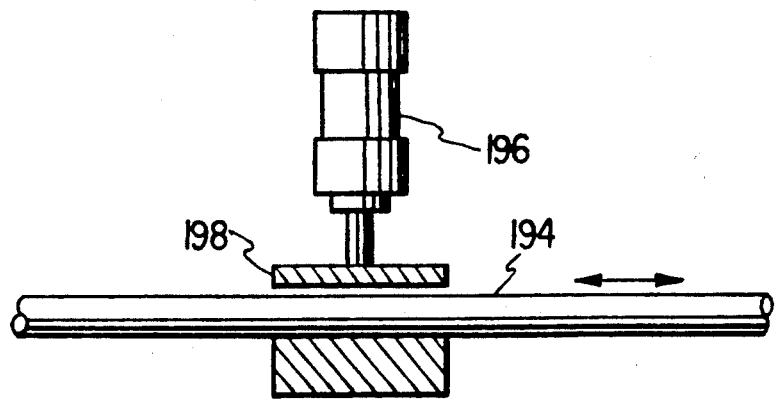
FIG. 44 is a longitudinal cross-sectional view of a fifth drive system for the movable bulkhead.

FIG. 44 shows a cable 194 that is moved back and forth longitudinally in the interior 26 of the body 24 by means not shown. A fluidic jack 196 is mounted in the movable bulkhead 50. Extension of the fluidic jack 196 causes a clamp 198 to engage the cable 194, which in turn causes the movable bulkhead 50 to move forward or backward depending on the direction of movement of the cable 194.

Figure 45:
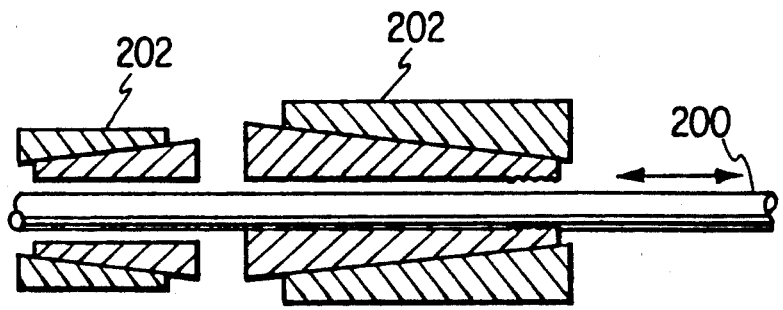
FIG. 45 is a longitudinal cross-sectional view of a sixth drive system for the movable bulkhead.

FIG. 45 shows a cable 200 that is moved back and forth longitudinally in the interior 26 of the body 24 by means not shown. A pair of oppositely disposed ramp jaws 202 are mounted in the movable bulkhead 50. Motion of the cable 200 to the right in FIG. 45 causes the right hand ramp jaw 202 to clamp the cable 200, which in turn causes the movable bulkhead 50 to move to the right. Similarly, movement of the cable 200 to the left in FIG. 45 causes the left hand ramp jaw 202 to clamp the cable 200, which in turns causes the movable bulkhead 50 to move to the left.

Figure 46:
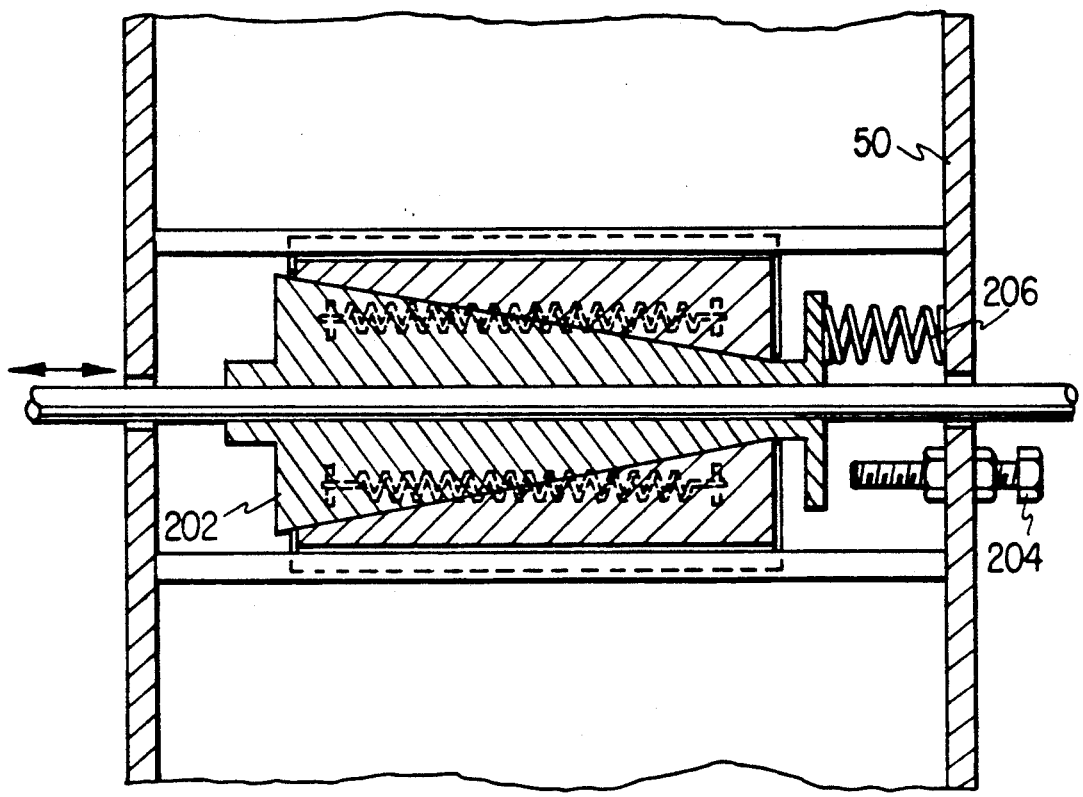
FIG. 46 is a longitudinal cross-sectional view of a seventh drive system for the movable bulkhead.

FIG. 46 is a more detailed view of one of the ramp jaws 202 of the type shown in FIG. 45. In addition, this figure shows that the rightward (clamping) movement of the inner segment of the ramp jaw 202 can be limited by an adjustable stop 204 and that the leftward (unclamping) movement of the inner segment of the ramp jaw 202 can be limited by a tension spring 206 that biases the inner segment toward clamping engagement with the outer segment.

Figure 47:
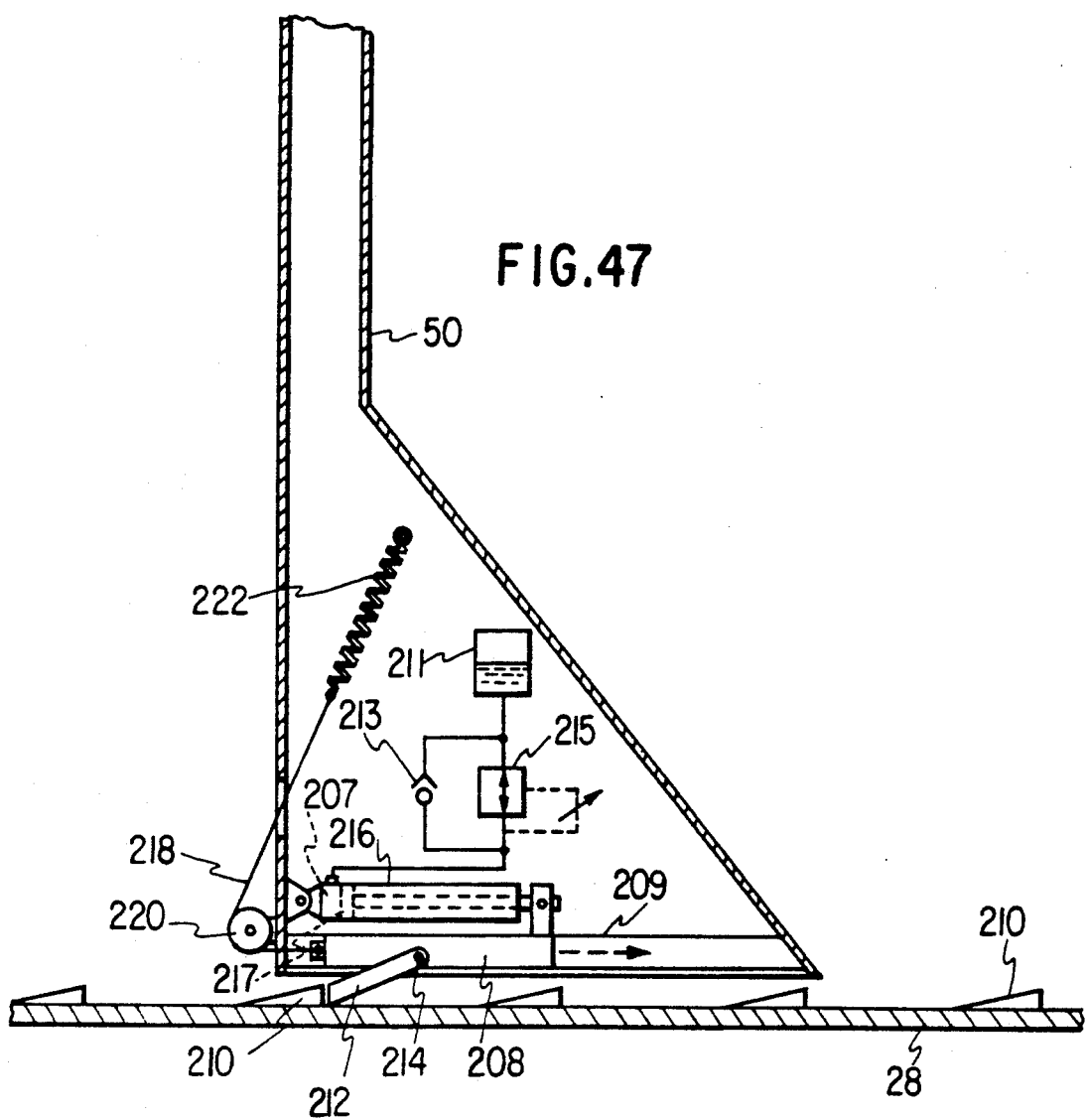
FIG. 47 is a longitudinal cross-sectional view of an eighth drive system for the movable bulkhead.

FIG. 47 shows a carriage 208 mounted in a slideway 209 inside the movable bulkhead 50 for movement relative thereto. A rack 210 is mounted on the upper surface of the internal floor 28, and a pawl 212 is pivotally mounted on the carriage 208 for movement about an axle 214 and in position to engage the rack 210. A fluidic jack 216 is mounted in the movable bulkhead 50 and connected at one end to the carriage 208 and at the other end to the movable bulkhead 50. Hence, extension of the fluidic jack 216 allows the carriage 208 to move rightwardly relative to the movable bulkhead 50, thus allowing the pawl 212 to move rightwardly relative to the rack 210. However, the carriage 208 is connected to the movable bulkhead 50 via a cable 218 (which, in the illustrated embodiment, is trained over a sheave 220) and a tension spring 222. Hence, the force of the tension spring 222 biases the carriage 208 and the pawl 212 leftwardly. Hydraulic fluid is contained in an expansion chamber 207 defined by a piston 217 in the fluidic jack 216 from a reservoir 211 through a one-way valve 213 and an adjustable pressure relief valve 215. Hence, hydraulic fluid from the reservoir 211 is present in the expansion chamber 207.

Movement of the internal floor 28 to the right (i.e., rearwardly in the interior 26) causes the rack 210 to push the pawl 212 and the carriage 208 to the right. The movable bulkhead 50 is pulled to the right by the cable 218, but the resiliency of the tension spring 222 permits the movable bulkhead 50 to move to the right by a smaller distance than the carriage 208 if the movable bulkhead 50 is obstructed. Then, when the internal floor 28 moves back to the left (i.e., forwardly in the interior 26), the pawl 212 pivots around the axle 214, riding up over one or more teeth in the rack 210 so that, when the internal floor 28 is again moved to the right, the carriage 208 and the movable bulkhead 50 will be driven rearwardly by a more rearward tooth in the rack 210 than the tooth that first drove it rearwardly.

FIGS. 48-52 show an arrangement in which the reciprocating movement of the two movable support surfaces 40 is used to draw the movable bulkhead 50 toward the rear end 36 of the body 24. Each of the two movable support surfaces 40 is driven in reciprocating motion by a corresponding fluidic jack 224. A rack 226 or other attachment means is provided on the upper surface of each of the movable support surfaces 40, and two pawls 228 are mounted on corresponding axles 230 on the movable bulkhead 50 in position to engage the corresponding racks 226. Thus extension of the two fluidic jacks 224 causes rearward motion of the two movable support surfaces 40, and the rearward motion of the two movable support surfaces 40 causes corresponding rearward motion of the movable bulkhead 50 via the racks 226, the pawls 228, and the axles 230. Then retraction of the fluidic jacks 224 causes the movable support surface 40 to move forwardly, but the movable bulkhead 50 remains in position, while the pawls 228 ride up over the next teeth of the rack 226 and into position for the next stroke.

Incidentally, it should be noted that the pressure of the matter 18 against the movable bulkhead 50 cannot cause the movable bulkhead 50 to move. This is so because the movable bulkhead 50 on the second-to-move floor section is stationary and is still engaging the movable bulkhead 50 as the first-to-move floor section is retracting. The movable bulkhead 50 is still engaged to the second-to-move floor section, so it can't move. When the second-to-move floor section moves, its pawl 228 is engaged to the rack 226 on the previously moved floor section, which has completed its retraction. Hence, the movable bulkhead 50 also can not move during this (i.e., the second) phase of the movement. Then, when the second-to-move floor section has fully retracted, its notch is behind its pawl 228. This in turn means that both floor sections will push on their respective pawls 228 during the next unloading stroke.

Longitudinal Sloping of The Floor

Figure 53:
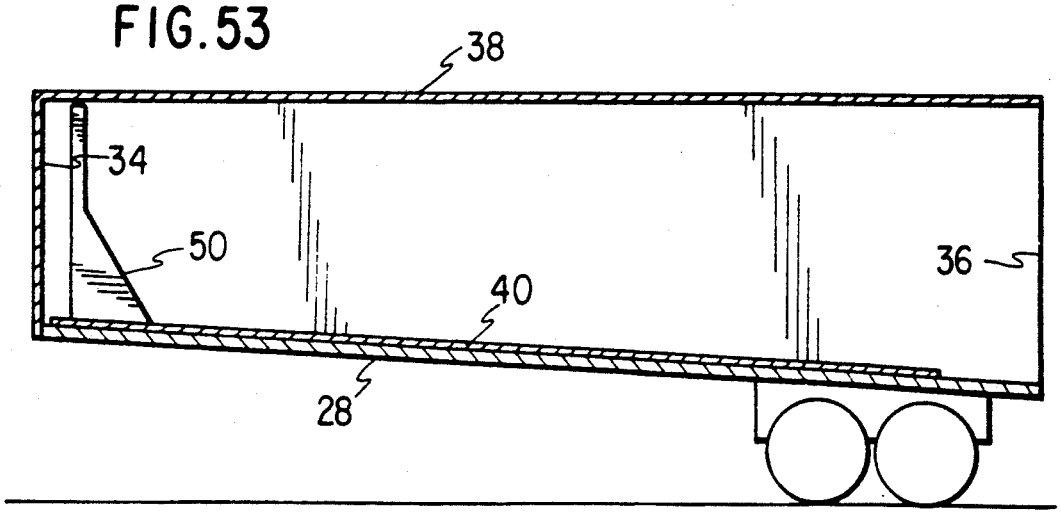
FIG. 53 shows an embodiment with a longitudinally slanted floor.

The previously discussed drawings have all shown the internal floor 28 as being horizontal in the longitudinal direction. While that is the preferred configuration in order to maximize the amount of matter 18 that can be carried in a given dimensional envelope, that is not the only possible configuration. FIG. 53 shows an embodiment in which the internal floor 28 is slanted downwardly toward the rear end 36 of the body 24, thus facilitating unloading of the matter 18 by biasing the load in the unloading direction.

Separability of The Body, The Movable Bulkhead, and The Movable Support Surfaces From The Drive Means While the previously described drawings have shown the drive means as being integral with the body 24, that certainly need not be the case.

Figure 54:
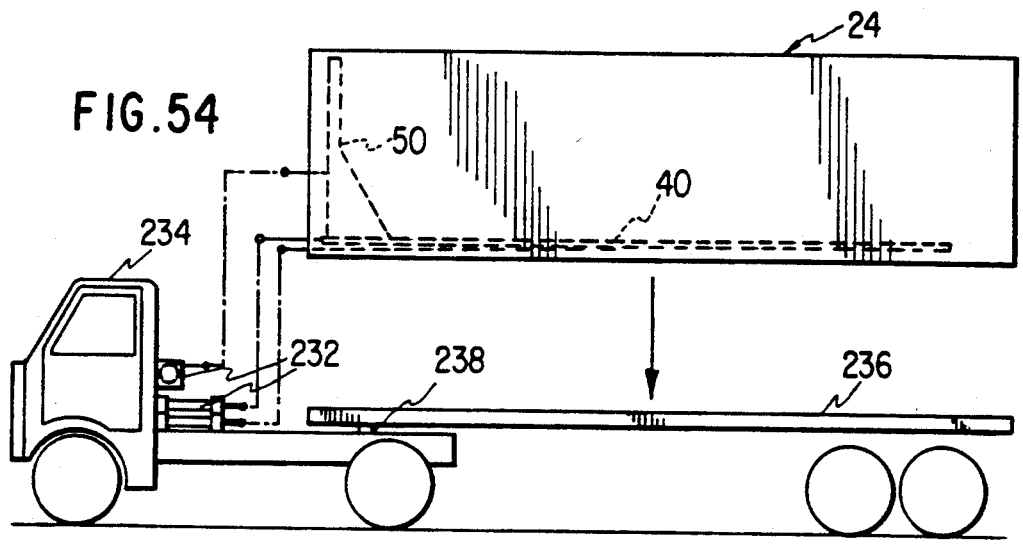
FIG. 54 shows an embodiment with the drive means mounted on a truck or truck-tractor.

In FIG. 54, drive means 232 are mounted on a truck 234, the truck 234 is connected to a trailer 236 by a fifth wheel 238, and the body 24 (containing the movable bulkhead 50 and the movable support surfaces 40) is mountable on the trailer 236.

Figure 55:
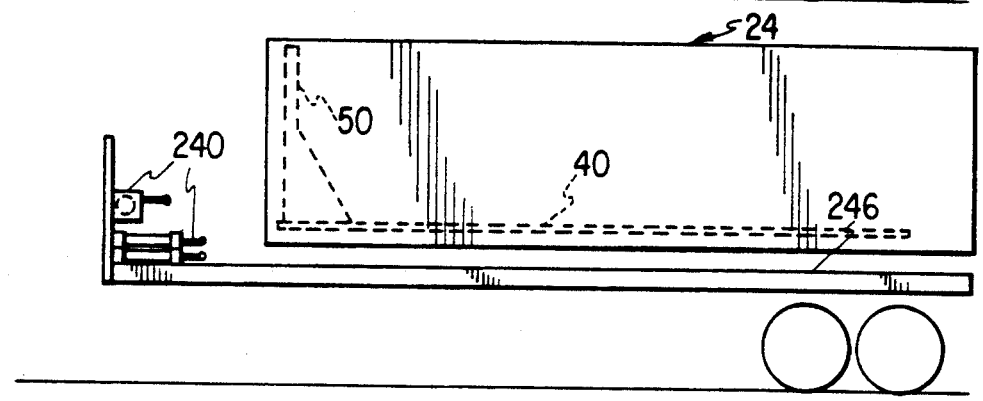
FIG. 55 shows an embodiment with the drive means mounted on a trailer that is separate from the body.

In FIG. 55, drive means 240 are mounted on a truck, and the body 24 (containing the movable bulkhead 50 and the movable support surfaces 40) is mountable on the truck 242.

Figure 56:
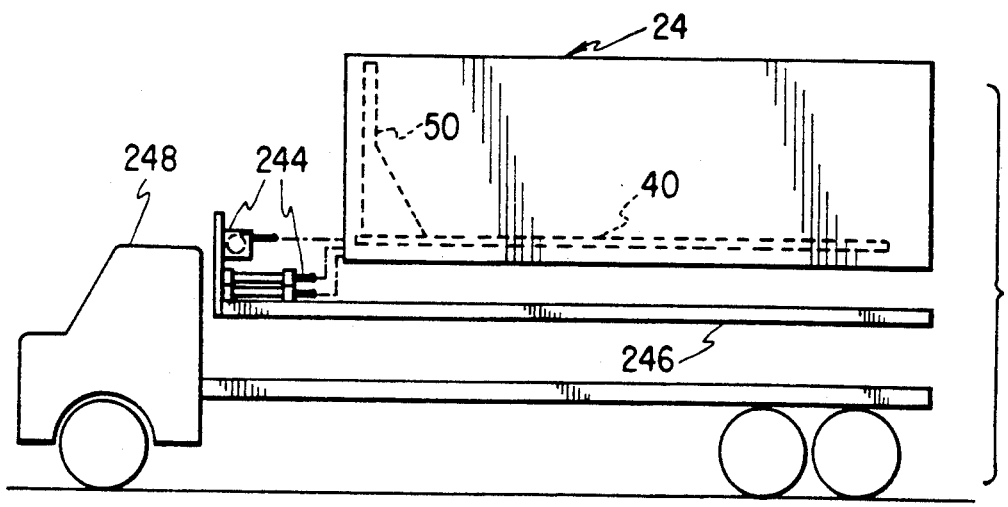
FIG. 56 shows an embodiment with the drive means mounted on an intermediate basis that is separate from both the truck and the body.

In FIG. 56, drive means 244 are mounted on a separate intermediate chasis 246 that in turn is mountable on a truck 248, and the body 24 (containing the movable bulkhead 50 and the movable support surfaces 40) is mountable on the intermediate chasis 246.

Caveat

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A cargo carrying vehicle comprising:
 (a) a body having an interior, an internal floor, a left internal sidewall, a right internal sidewall, a front end, and a rear end;
 (b) two or more movable support surfaces mounted on said internal floor for movement relative thereto, each one of said two or more movable support surfaces having a front end and a rear end;
 (c) first means for moving each one of said two or more movable support surfaces back and forth between a first position and second position spaced longitudinally from said first position toward said rear end of said body, said first means comprising:
   i) a first fluidic jack that is mounted at or near said front end of said body and that is connected to the front end of one of said movable support surfaces, and
   ii) a second fluidic jack that is mounted at or near said front end of said body and that is connected to the front end of the other of said movable support surfaces;
 (d) a movable bulkhead mounted in said interior above said two or more movable support surfaces for movement relative to said internal floor; and
 (e) second means for moving said movable bulkhead back and forth between a first position and a second position spaced longitudinally from said first position toward said rear end of said body.

2. A cargo carrying vehicle comprising:
(a) a body having an interior, an internal floor, a left internal sidewall, a right internal sidewall, a front wall, and a rear opening;
(b) at least two individually movable longitudinally extending strips:
 (i) that are mounted on said internal floor for movement relative thereto;
 (ii) that each have a front end and a rear end; and
 (iii) that are shorter than said internal floor;
(c) first means for moving each said movable strip back and forth between a first position and a second position spaced longitudinally from said first position toward said rear opening of said body;
(d) a movable bulkhead mounted in said interior above said strips for movement relative to said internal floor and said strips;
(e) second means for holding said movable bulkhead in fixed position relative to said strips while said strips move relative to said internal floor; and
(f) third means for holding said movable bulkhead in fixed position relative to said internal floor while said strips move relative to said internal floor;
(g) the materials of which said internal floor and said strips are made and the ratio of the surface area of said strips exposed by said movable bulkhead to the surface area of said internal floor exposed by said strips being selected so that, for the type and weight of load for which said cargo carrying vehicle is designed, the frictional forces between the load and said strip and between the load and said internal floor during movement of said strips bias the load as a whole to move with said strips.

3. A cargo carrying vehicle as recited in claim 2 wherein said at least two strips move separately in sequence in at least one direction.

4. A cargo carrying vehicle as recited in claim 2 wherein said at least two strips are spaced transversely from one another and expose a portion of said internal floor therebetween.

5. A cargo carrying vehicle as recited in claim 2 wherein said at least two strips move together in a least one direction.

6. A cargo carrying vehicle as recited in claim 2 wherein said at least two strips move separately in sequence in one direction and in unison in the other direction.

7. A cargo carrying vehicle comprising:
(a) a body having an interior, an internal floor, a left internal sidewall, a right internal sidewall, a front wall, and a rear opening;
(b) at least one movable support surface;
 (i) that is mounted on said internal floor for movement relative thereto;
 (ii) that has a front end and a rear end; and
 (iii) that is shorter than said internal floor;
(c) first means for moving said movable support surface back and forth between a first position and a second position spaced longitudinally from said first position toward said rear opening of said body;
(d) a movable bulkhead mounted in said interior above said movable support surface for movement relative to said internal floor and said movable support surface; so that,
 (i) said movable bulkhead moves rearwardly with the rearward stroke of said movable support surface; and
 (ii) said movable bulkhead remains stationary relative to said internal floor during the forward stroke of said movable support surface;
(e) second means for holding said movable bulkhead in fixed position relative to said strips while said movable support surface moves relative to said internal floor; and
(f) third means for holding said movable bulkhead in fixed position relative to said internal floor while said movable support surface moves relative to said internal floor;
(g) the materials of which said internal floor and said movable support surface are made and the ratio of the surface area of said movable support surface exposed by said movable bulkhead to the surface area of said internal floor exposed by said movable support surface being selected so that, for the type and weight of load for which said cargo carrying vehicle is designed, the frictional forces between the load and said movable support surface and between the load and said internal floor during movement of said movable support surface bias the load as a whole to move with said movable support surface.

* * * * *